US009752707B2

(12) United States Patent
Richardson

(10) Patent No.: US 9,752,707 B2
(45) Date of Patent: Sep. 5, 2017

(54) DOUBLE-JACKETED FIRE HOSE WITH FILAMENT BUNDLE STRIPES

(71) Applicant: Mercedes Textiles Ltd., St. Laurent (CA)

(72) Inventor: Robert Richardson, Cookshire (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 109 days.

(21) Appl. No.: 14/382,183

(22) PCT Filed: Mar. 1, 2013

(86) PCT No.: PCT/CA2013/000183
§ 371 (c)(1),
(2) Date: Aug. 29, 2014

(87) PCT Pub. No.: WO2013/126994
PCT Pub. Date: Sep. 6, 2013

(65) Prior Publication Data
US 2015/0059907 A1    Mar. 5, 2015

Related U.S. Application Data

(60) Provisional application No. 61/605,807, filed on Mar. 2, 2012.

(51) Int. Cl.
| | |
|---|---|
| *F16L 11/02* | (2006.01) |
| *F16L 11/20* | (2006.01) |
| *F16L 57/06* | (2006.01) |
| *A62C 33/00* | (2006.01) |

(52) U.S. Cl.
CPC ............... *F16L 11/02* (2013.01); *F16L 11/20* (2013.01); *F16L 57/06* (2013.01); *A62C 33/00* (2013.01)

(58) Field of Classification Search
CPC ............. F16L 11/02; F16L 11/20; F16L 57/06
USPC ................................. 138/124, 137, 141, 144
See application file for complete search history.

(56) References Cited

U.S. PATENT DOCUMENTS

| | | | | |
|---|---|---|---|---|
| 2,598,022 A | | 5/1952 | Smith | |
| 2,612,910 A | * | 10/1952 | Krupp .................. | B29D 23/001 138/128 |
| 2,833,313 A | * | 5/1958 | Penman ............... | B29D 23/001 138/125 |
| 3,062,241 A | * | 11/1962 | Brumbach ............ | F16L 11/086 138/125 |
| 3,654,967 A | * | 4/1972 | Atwell .................. | F16L 11/112 138/144 |
| 4,384,595 A | * | 5/1983 | Washkewicz ......... | F16L 11/082 138/124 |
| 2010/0126617 A1 | * | 5/2010 | Stroempl .............. | F16L 11/125 138/137 |

(Continued)

*Primary Examiner* — Vishal Pancholi
(74) *Attorney, Agent, or Firm* — Ware, Fressola, Maguire & Barber LLP

(57) ABSTRACT

The present invention thus provides a double-jacketed lay-flat fire hose having an inner tube for conveying fluid, an inner jacket surrounding the inner tube and an outer jacket surrounding the inner jacket. The outer jacket is made of an abrasion-resistant woven fabric material that includes four longitudinal, spaced-apart and generally parallel stripes formed each of a bundle of longitudinally aligned filament yarns. This outer jacket is less prone to trapping air between the outer jacket and the inner jacket.

13 Claims, 1 Drawing Sheet

(56) References Cited

U.S. PATENT DOCUMENTS

2011/0000572 A1* 1/2011 Ramaswamy ............ B32B 1/08
138/149

* cited by examiner

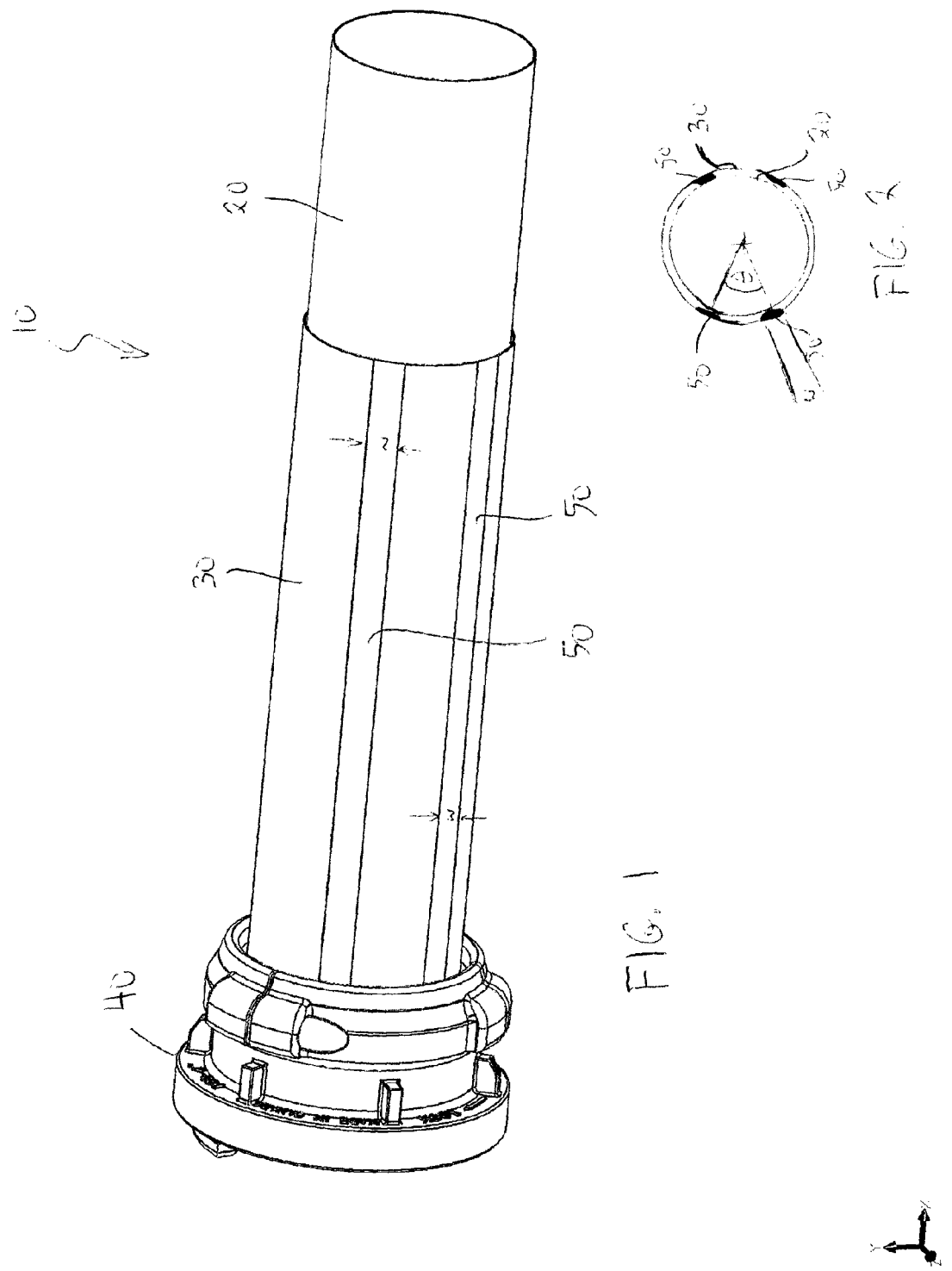

DOUBLE-JACKETED FIRE HOSE WITH FILAMENT BUNDLE STRIPES

CROSS-REFERENCE TO RELATED APPLICATIONS

This application corresponds to international patent application serial no. PCT/CA2013/000183, filed 1 Mar. 2013, which claims benefit to provisional patent application Ser. No. 61/605,807, filed 2 Mar. 2013, which is incorporated by reference in their entirety.

TECHNICAL FIELD

The present invention relates to fire hoses and, in particular, to double-jacketed fire hoses.

BACKGROUND

Many different types of fire hoses are known in the art. One type of fire hose is a double-jacketed fire hose. This fire hose has two jackets (i.e. an inner jacket and an outer jacket) as well as an inner tube ("waterway" or "lining") for carrying water or other firefighting fluid. The inner and outer jackets thus form a two-layered outer sheath that envelops and protects the inner tube (waterway) from wear. The inner tube may be may of any suitable polymer or elastomer. The inner and outer jackets may be made of any suitable abrasion-resistant woven fabrics.

One problem, discovered by Applicant, that arises when these fire hoses are folded or rolled when wet is that air may become trapped between the inner jacket and the outer jacket. This air makes it difficult to properly fold or roll the fire hose after usage as the hose will not lay flat.

A solution to this technical problem is disclosed herein.

SUMMARY

The present invention thus provides a double-jacketed fire hose having an inner tube (waterway) for conveying fluid, an inner jacket surrounding the inner tube and an outer jacket surrounding the inner jacket. The outer jacket is made of an abrasion-resistant woven spun yarn material that includes four longitudinal, spaced-apart and generally parallel stripes formed each of a bundle of longitudinally aligned filament yarns. This outer jacket is less prone to trapping air between the outer jacket and the inner jacket because the filament yarns do not absorb water like spun yarn.

Accordingly, the present invention provides a double-jacketed fire hose comprising an inner tube for conveying fluid, an inner jacket surrounding the tube, and an outer jacket surrounding the inner jacket, the outer jacket being made of an abrasion-resistant woven fabric made of spun yarn, the fabric comprising a plurality of longitudinally aligned, spaced-apart and generally parallel stripes formed of bundles of longitudinally aligned filament yarns.

BRIEF DESCRIPTION OF DRAWINGS

FIG. 1 is an isometric view of a novel double-jacketed lay-flat fire hose in accordance with an embodiment of the present invention; and FIG. 2 is a cross-sectional view of the fire hose of FIG. 1.

DETAILED DESCRIPTION

FIG. 1 depicts a novel double-jacketed lay-flat fire hose generally designated by reference numeral 10. This fire hose has an inner jacket 20 and an outer jacket 30. The fire hose is attached to a coupling (or coupler) 40 such as for example a threaded coupling or a Storz-type coupling.

In FIG. 1, the outer jacket is shown to be shorter than the inner jacket for illustrative purposes only. It will be appreciated that the outer jacket will generally be as long as the inner jacket. The inner and outer jackets together form a double-layered jacket that protects the inner tube over substantially its entire length. Likewise, it should be understood that the length, diameter, annular gap between the inner and outer jackets, and other dimensions and ratios are intended to be exemplary only. The inventive concept may be applied to fire hoses of any length, diameter, annular gap, etc.

As depicted in FIG. 1, the fire hose 10 has an outer jacket having two spaced-apart, generally parallel stripes 50. Each of these stripes is formed of a bundle of longitudinally aligned filament yarns. The two bundles (or stripes) of filament yarns are woven directly into the spun yarn of the outer jacket to provide the desired effect of inhibiting air from becoming trapped in the inter-jacket space between the inner and outer jackets.

Although the illustrated embodiment contains four stripes (bundles), it will be appreciated that variants may include more than four such stripes (bundles). In other words, in another embodiment, there may be six stripes of filament yarns. In yet another embodiment, there may be eight or more stripes of filament yarns.

In the main embodiment illustrated in FIG. 1, the filament yarns extend over substantially a complete length of the outer jacket. In a variant, however, the filament yarns may extend over less than the complete length of the outer jacket. The stripes may be formed of bundles of continuous filament yarns or they may be formed of adjoining segments of bundles that together extend over the complete length of the outer jacket.

In one embodiment, each bundle comprises between 16 and 24 filament yarns. This design has been found to work well. However, it will be appreciated that bundles having a different number of filament yarns may also be employed.

As further shown by way of example in FIG. 2, the two bundles may subtend an angle θ (theta) of between 20 and 90 degrees.

In one embodiment, an arc length ("width" w) of each bundle represents between 3 and 10% of a total circumference of the outer jacket. For example, in one embodiment, the width w is ½ inch to ⅝ inch for a 5 to 6 inch diameter hose. In one embodiment, the width represents 3-8% of a circumference of the outer jacket.

The filaments in each filament yarn may be made of nylon, polyester, etc. Other materials may be substituted.

The fire hose described above inhibits the formation of unwanted air trapped between the inner jacket and the outer jacket. This novel fire hose thus facilitates the folding or rolling of the fire hose after usage.

The embodiments of the present invention that are described herein are intended to be exemplary only. Persons of ordinary skill in the art will appreciate that variations, modifications and refinements may be made to the inventive concept(s) presented herein.

The invention claimed is:

1. A double-jacketed fire hose comprising an inner tube for conveying fluid, an inner jacket surrounding the tube, and an outer jacket surrounding the inner jacket, the outer jacket being made of an abrasion-resistant woven fabric, the fabric comprising a plurality of longitudinally aligned, spaced-apart and generally parallel stripes, each of the stripes being formed of spaced-apart bundles of longitudinally aligned filament yarns, wherein the outer jacket comprises four spaced-apart bundles of longitudinally aligned filament yarns, wherein each of the four bundles has a width that is 3 to 10% of a circumference of the outer jacket, wherein the four spaced-apart bundles inhibit air from becoming trapped in the inter-jacket space between the inner and outer jackets.

2. The fire hose as claimed in claim 1 wherein the filament yarns extend over substantially a complete length of the outer jacket.

3. The fire hose as claimed in claim 1 wherein each bundle comprises between 16 and 24 filament yarns.

4. The fire hose as claimed in claim 2 wherein each bundle comprises between 16 and 24 filament yarns.

5. The fire hose as claimed in claim 1 wherein four bundles are woven into the fabric of the outer jacket such that two bundles of a first pair subtend an angle of between 20 and 90 degrees and two bundles of a second pair also subtend an angle of between 20 and 90 degrees.

6. The fire hose as claimed in claim 1 wherein the width of each bundle represent 3 to 8% of the circumference of the outer jacket.

7. The fire hose as claimed in claim 1 wherein the filament yarns are made of polyester.

8. The fire hose as claimed in claim 2, wherein the outer jacket comprises four bundles woven into the fabric of the outer jacket such that two bundles of a first pair subtend an angle of between 20 and 90 degrees and two bundles of a second pair also subtend an angle of between 20 and 90 degrees.

9. The fire hose as claimed in claim 3, wherein the four bundles are woven into the fabric of the outer jacket such that two bundles of a first pair subtend an angle of between 20 and 90 degrees and two bundles of a second pair also subtend an angle of between 20 and 90 degrees.

10. The fire hose as claimed in claim 2 wherein the width of each bundle represent 3 to 8% of the circumference of the outer jacket.

11. The fire hose as claimed in claim 3 wherein the width of each bundle represent 3 to 8% of the circumference of the outer jacket.

12. The fire hose as claimed in claim 5 wherein the width of each bundle represent 3 to 8% of the circumference of the outer jacket.

13. The fire hose as claimed in claim 2 wherein the filament yarns are made of polyester.

\* \* \* \* \*